Dec. 17, 1946.　　　　R. S. DAVIS　　　　2,412,565
EGG CLEANING MACHINE
Filed Aug. 23, 1943　　　　5 Sheets-Sheet 1

INVENTOR.
Roy Stanley Davis
BY
Earl T Chaffell
ATTORNEYS.

Dec. 17, 1946.  R. S. DAVIS  2,412,565
EGG CLEANING MACHINE
Filed Aug. 23, 1943  5 Sheets-Sheet 3

INVENTOR.
Roy Stanley Davis
BY
Carl H. Chappell
ATTORNEYS.

Dec. 17, 1946.  R. S. DAVIS  2,412,565
EGG CLEANING MACHINE
Filed Aug. 23, 1943  5 Sheets-Sheet 4

INVENTOR.
Roy Stanley Davis.
BY Earl & Chappell
ATTORNEYS.

Patented Dec. 17, 1946

2,412,565

UNITED STATES PATENT OFFICE 2,412,565

EGG CLEANING MACHINE

Roy Stanley Davis, Otsego, Mich.

Application August 23, 1943, Serial No. 499,663

29 Claims. (Cl. 15—3.15)

This invention relates to improvements in egg cleaning machines.

The main object of this invention are:

First, to provide an egg cleaning machine by which eggs may be rapidly and effectively cleaned with a very small amount of breakage.

Second, to provide an egg cleaning machine which is simple and economical in structure and at the same time of large capacity.

Third, to provide an egg cleaning machine having these advantages which may be operated by persons of little mechanical skill.

Fourth, to provide a tray for egg cleaning machines which effectively supports the eggs while permitting their rotation on the long axes of the eggs.

Fifth, to provide in an egg cleaning machine a tray which, while effectively supporting the eggs, minimizes the wear on the brushes.

Further objects pertaining to details and economies of the invention will definitely appear from the decription to follow. The invention is defined in the claims.

A structure which embodies the features of my invention is clearly illustrated in the accompanying drawings, in which:

Fig. 9 is a fragmentary view partially in section illustrating details of the carriage and its slideway and slideway mounting.

Figure 14:
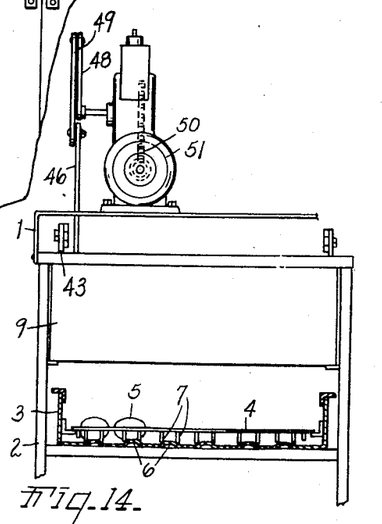
Fig. 14 is a fragmentary transverse section on a line corresponding to line 14—14 of Fig. 11.
Figures 15, 16, 17, 18:
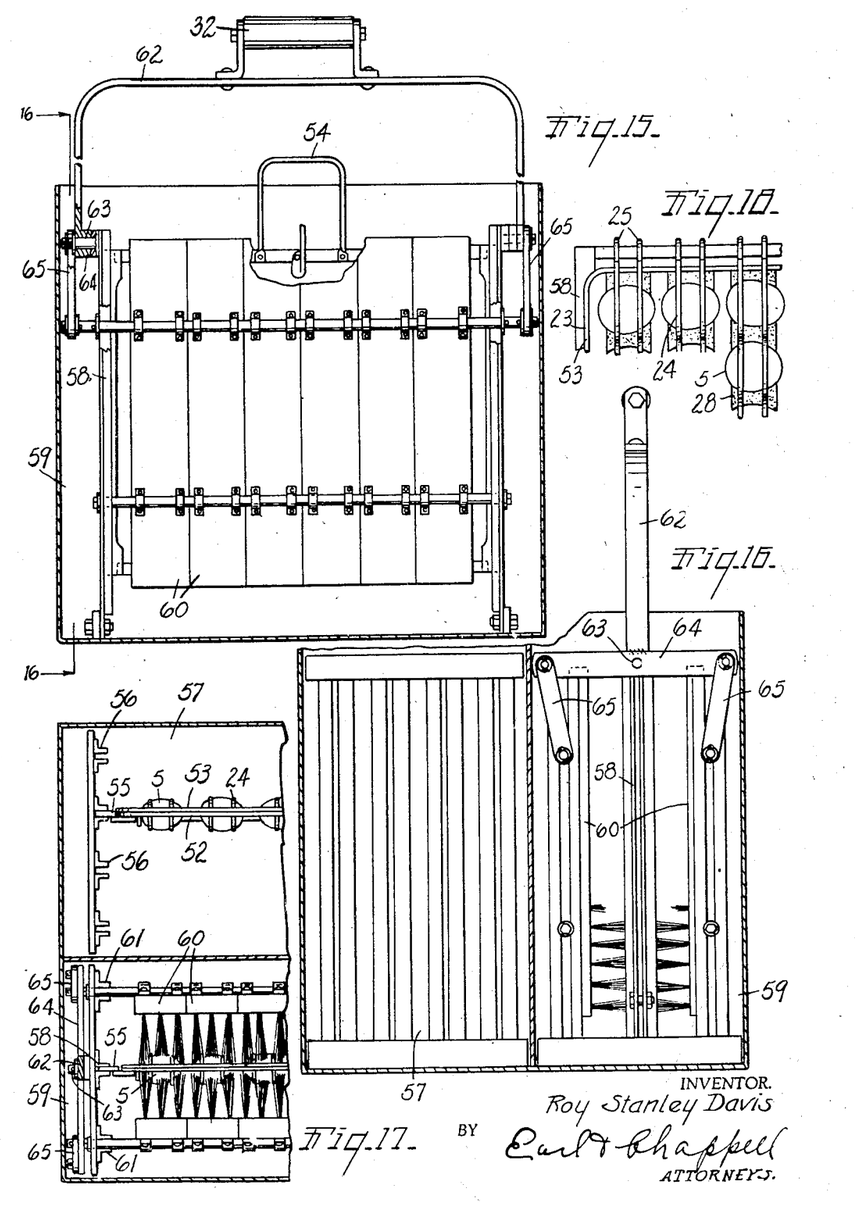
Fig. 15 is a fragmentary view partially in vertical section of a modified form or embodiment of my invention particularly adapted for hand operation.
Fig. 16 is a fragmentary view partially in vertical section on line 16—16 of Fig. 15.
Fig. 17 is a fragmentary plan view partially in horizontal section showing further structural details.
Fig. 18 is a fragmentary view of the egg tray of the embodiment shown in Figs. 15, 16 and 17.

In the embodiment of my invention shown in Figs. 1 to 10, inclusive, I provide a supporting structure designated generally by the numeral 1 and having suitable legs 2 designed to support the parts in convenient position for the operator. This supporting structure carries a preliminary soaking tank 3 adapted to contain a suitable cleaning solution and extending at both ends beyond the legs or uprights 2 of the main frame. This permits trays 4 loaded with eggs conventionally illustrated at 5 to be placed thereon at one end, to be removed therefrom at the other, the trays being pushed along one after the other on the bottom of the tank, which preferably has longitudinal corrugations 6 which project between the longitudinal egg supporting wires or strands 7 of the trays, engaging the eggs between the egg supporting strands to cause them to rotate and thereby bring all portions of the eggs into contact with the cleaning fluid. This is best illustrated in Fig. 14.

These longitudinal strands receiving the eggs have corrugations 8 forming spaced seats which rotatively support the eggs.

Figures 10, 11:
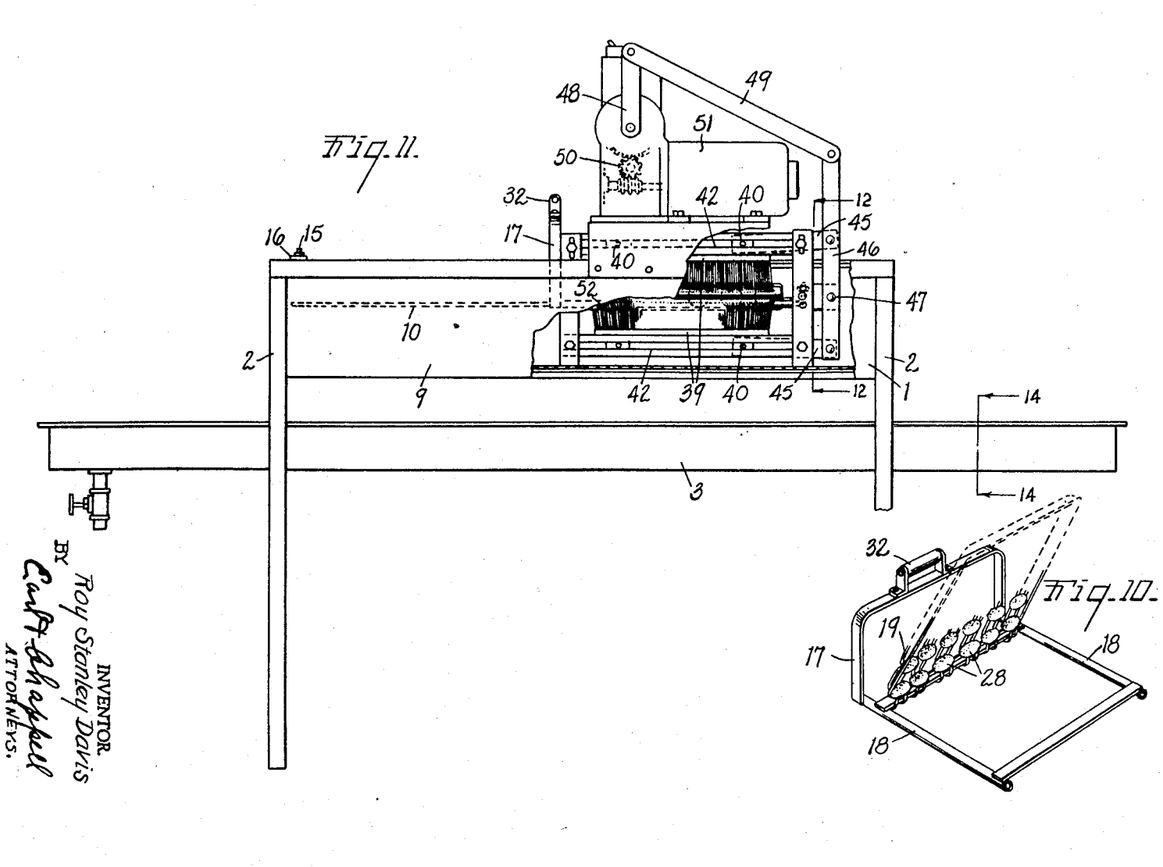
Fig. 10 is a fragmentary perspective view of the carriage with a tray cover member mounted thereon.
Fig. 11 is a fragmentary side elevation of a modified form or embodiment of my invention, the modification being mainly in the type of cleaning brushes and the driving means therefor.

The cleaning tank 9 is mounted above the preliminary soaking tank 3 and is also adapted to receive a suitable cleaning fluid. This tank has rod-like slideways 10 mounted at opposite sides thereof supported at one end by means of the cross rod 11, the ways having upturned ends 12 arranged through the rod and receiving the nuts 13. At the other ends the ways rest on the cross member 14 of the hanger 15. This hanger consists of a top bar 16 adapted to rest on the top of the tank which permits the rods being swung up on their cross support 11 to permit placing thereon and removal therefrom of the carriage designated generally by the numeral 17 and comprising tubular slides 18 receiving the slide rods 10 (Figs. 9 and 10).

The carriage is adapted to receive one of the trays 4. In practice there is a number of these trays; they may be successively loaded and placed in the preliminary soaking tank and from there transferred to the carriage. The carriage also carries a tray cover member designated generally by the numeral 19, this cover member being hinged to the carriage as best shown in Fig. 10 and adapted to be swung down upon the loaded tray and secured in closed position by means of the latch 20. The loaded carriage is adapted to be reciprocated between the brushes which in the embodiment illustrated shown in Figs. 1 to 10, inclusive, are rotary brushes 21 disposed in opposed pairs and vertically spaced to receive the loaded trays between them with the brushes in operative relation to the contents of the trays. The loaded trays are permitted to remain in operative relation to the brushes for the desired or necessary period, the carriage is then retracted, the cover opened, the tray removed and another inserted, and the operation repeated.

The trays comprise border members 22 of suitable rod stock or heavy wire stock, and the longitudinal wires 7 are secured at their ends to the front and rear portions of this frame. These longitudinal members, as stated, are corrugated to provide pockets or seats for the eggs, the eggs being thus supported in rows and spaced in the rows. The eggs are arranged with their long axes transversely of the path of travel of the carriage.

The cover member 19 comprises a suitable border frame 23 and longitudinal wires 24 (Figs. 4, 5 and 6) terminating at the rear ends in the eyes 25 pivoted to the rear cross member 26 on the carriage. The wires or strands 24 are provided with a plurality of loop-like offsets 27 which are suitably spaced to engage and support the combined cushioning and cleaning members 28 which are formed preferably of sponge rubber and preferably of a synthetic product. The loops form fingers which engage in holes 29 (Figs. 7 and 8), the ends of the members being slotted at 30 to facilitate this engagement. It will be understood that there is no displacing strain on these members when in use. The cleaning members 28 preferably have concavely curved sides 31 which engage the eggs as shown in Fig. 6, cushioning the same while permitting their rotative movement.

The carriage is provided with a handle 32 by means of which it is advanced into cooperating relation with the brushes 21 which, as stated, are arranged in opposed pairs to receive the racked eggs between them.

Figures 1, 3, 6, 7, 8:
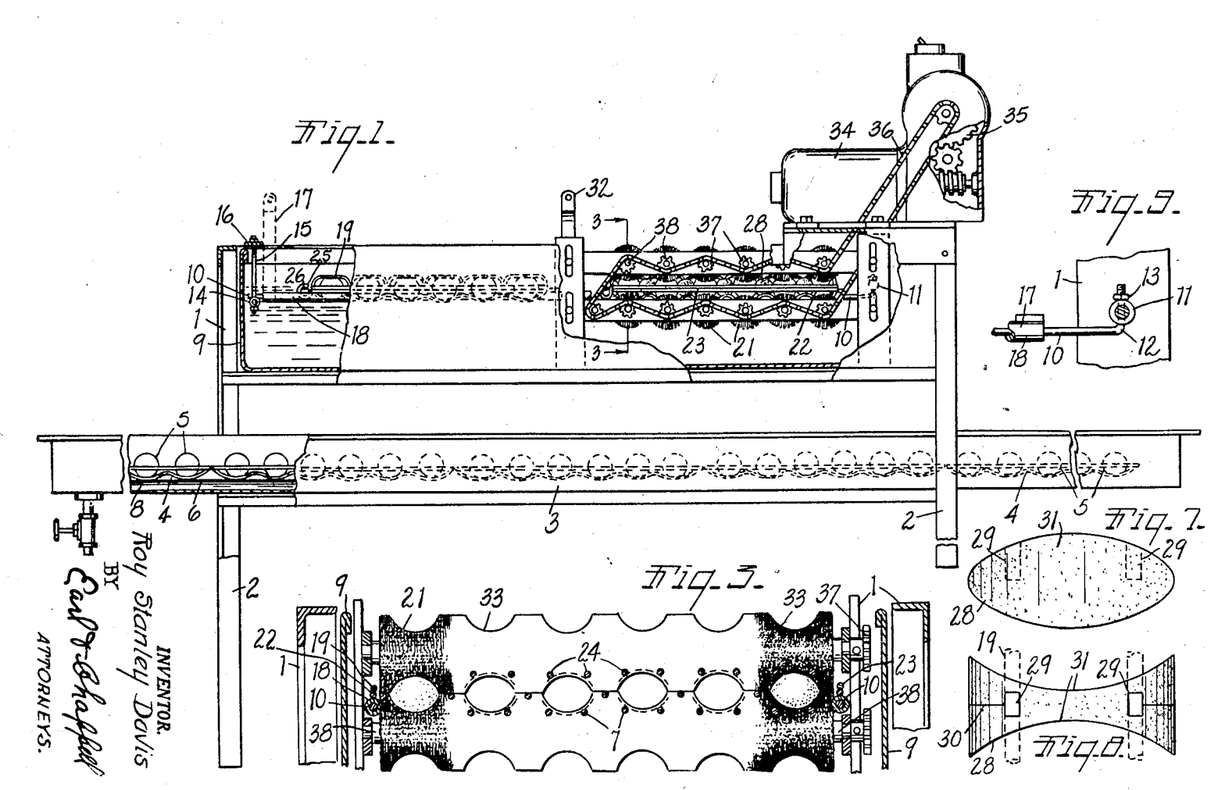
Fig. 1 is a fragmentary side elevation of an egg cleaning machine embodying my invention, parts being broken away and parts being shown in longitudinal section for convenience in illustration.
Fig. 3 is an enlarged fragmentary view partially in transverse vertical section on line 3—3 of Fig. 1.
Fig. 6 is a fragmentary plan view of the tray and its cover with eggs and certain of the pocket cells indicated by dotted lines, the carriage not being illustrated.
Fig. 7 is a side elevation of one of the combined cushioning and cleaning elements carried in the embodiment illustrated by the cover.
Fig. 8 is a plan view of one of the combined cleaning and cushioning elements, fragmentary portions of the cover being shown by dotted lines.
Figure 2:
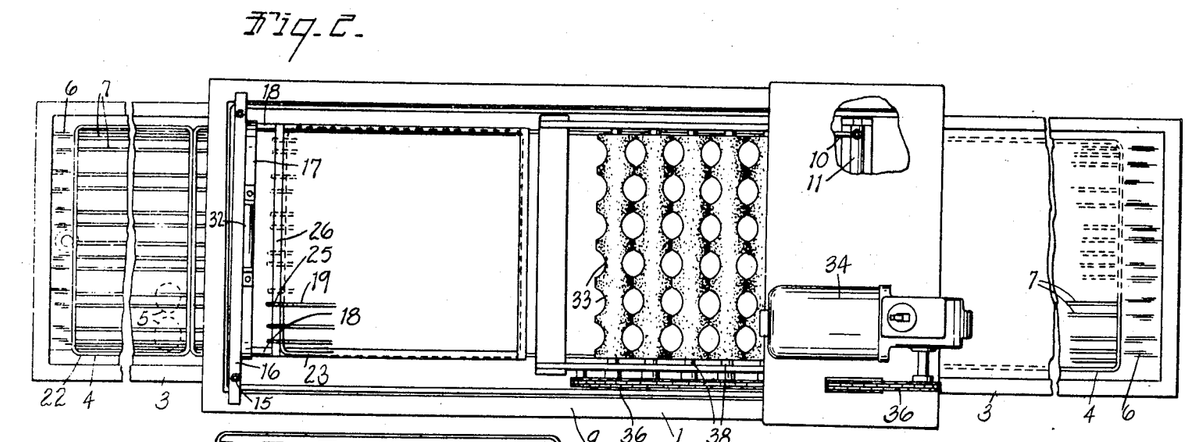
Fig. 2 is a fragmentary plan view, parts being shown conventionally.
Figures 4, 5:
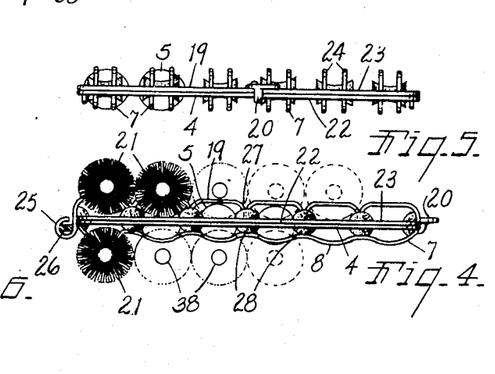
Fig. 4 is an enlarged fragmentary view with parts shown diagrammatically and conventionally illustrating the relation of the egg tray to the rotary cleaning brushes of the type shown in Fig. 2.
Fig. 5 is an end elevation of the tray and its cover looking from the right of Fig. 4, eggs being illustrated in certain of the cells or pockets.
Figure 6:
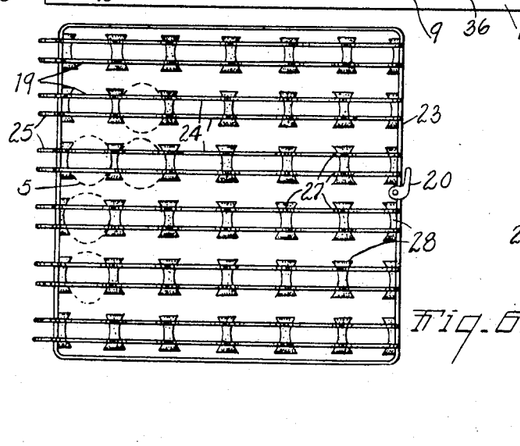

By reference to Fig. 6 it will be noted that the egg supporting wires or rods and also the coacting cover wires or rods are arranged longitudinally of the carriage, and that there are no cross strands or tie members. This is of great advantage in that the wear on the brushes is minimized and also the greatest access to the eggs is afforded.

The eggs are arranged with their long axes transversely of the path of travel of the carriage, and they are rotatively supported in their seats in the tray between the combined cushioning and cleaning elements 28. These elements 28 serve to effectively cushion the eggs as they are pushed into and retracted from the brushes and to absorb the inertia of the eggs as the carriage is reciprocated, even if reciprocated quite violently, so even thin-shelled eggs and eggs having delicate shells may be cleaned. The brushes are preferably provided with annularly concave portions 33 alined with the rows of eggs translated by the carriage, and this further insures effective cleaning and contacting of all portions of the eggs.

In the embodiment illustrated in Figs. 1 to 10 the rotary brushes are driven by means of a suitable prime mover or motor 34 through suitable gearing as indicated generally by the numeral 35 and the sprocket chain 36 which is rove over and under adjacent sprockets 37 at one end of the shafts 38 of the brushes. This results in adjacent pairs of brushes being driven in opposite directions, which is a still further desirable feature in cleaning the eggs, as they are effectively rotated and brought into contact with the cleaning and cushioning elements 38.

Figure 12:
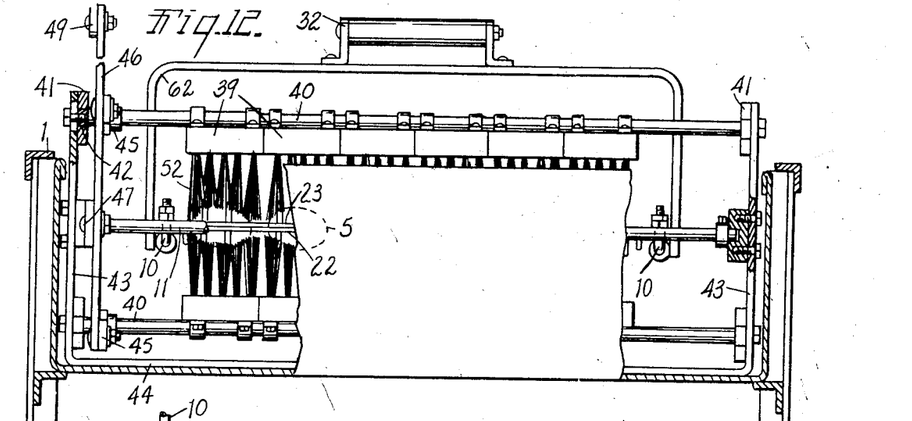
Fig. 12 is an enlarged fragmentary view partially in transverse section on a line 12—12 of Fig. 11.
Figure 13:
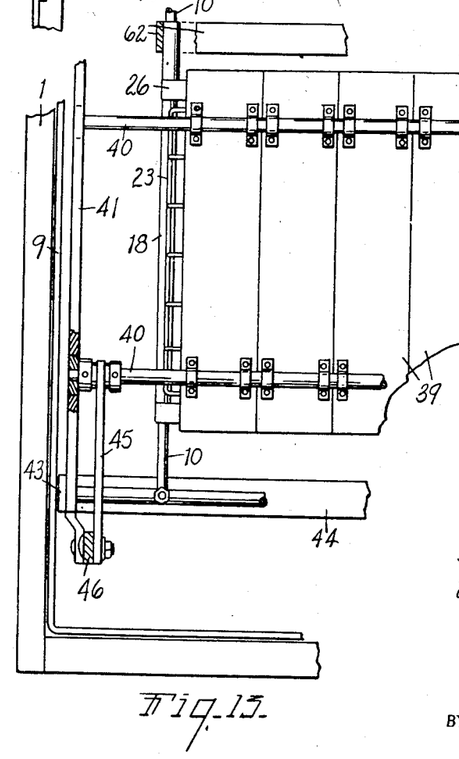
Fig. 13 is a fragmentary plan view showing the relation and mounting of the brushes.

In the embodiment of my invention shown in Figs. 11 to 14, inclusive, the brushes 39 are mounted to reciprocate in opposite directions, the brushes being mounted on transverse rods 40 carried by the slides 41 reciprocating in ways 42 carried by the uprights 43 of the supports 44 (Figs. 12 and 13). These slides are connected by links 45 to the lever 46 pivoted at 47, the lever being connected to the crank 48 by the connecting rod 49. The crank is driven through suitable gearing designated generally by the numeral 50 from the motor 51. The bristles 52 of the brushes 39 are preferably concavely cut as shown in Fig. 12 to more effectively contact the eggs as is indicated in that figure. In this structure the same carriage and trays may be used as in the previously described embodiment.

In the embodiment of my invention shown in Figs. 15 to 18, inclusive, the trays 52 are preferably the same as described and the cover 53 substantially the same. Instead of mounting the trays on the carriage they are provided with handles 54 and with slides 55 adapted to slidably engage the ways 56 in the preliminary soaking tank 57 or the corresponding way 58 in the cleaning tank 59. The brushes 60 in this embodiment are of the reciprocating type and are mounted in vertical slideways 61 for vertical reciprocation by means of the hand lever 62. This hand lever is pivoted at 63 and has a cross-arm or rocking bar 64 at its lower end. This cross arm or rocking bar is connected by the links 65 to the brush slides. This embodiment of my invention is well adapted for use in smaller establishments where motor power is not available. The machine is very effective, however, and the eggs to be cleaned are racked so that there is very little breakage, even when the eggs have thin or delicate shells.

It is one of the objects of the invention to provide means for handling the eggs in cleaning to minimize breakage and, of course, another prime object is the effective and rapid cleaning of the eggs. I have attained these results in all the embodiments illustrated. I have not attempted to illustrate other embodiments and adaptations which I contemplate as I believe the disclosures made will enable those skilled in the art to embody and adapt my invention as may be desired.

Having thus described my invention what I claim as new and desire to secure by Letters Patent is:

1. In a cleaning machine, the combination with a tank, of slideways disposed therein, a carriage reciprocable on said slideways, a tray removably received by said carriage for movement through a cleaning fluid in said tank and comprising a border frame and a plurality of laterally spaced pairs of longitudinally disposed wires having spaced corrugations therein providing rows of seats adapted to receive and rotatably support eggs with their long axes disposed transversely of the path of travel of the carriage, a cover member hinged to the carriage to be closed over a tray arranged on said carriage and comprising a plurality of pairs of longitudinally disposed wires spaced to correspond to the spacing of the pairs of wires of the tray, the wires of said cover having spaced loop-like offsets therein, a plurality of combined cushioning and cleaning elements of sponge rubber engaged with said loop-like offsets whereby they are positioned between the eggs arranged in the tray when the cover is closed and yieldably engage the same while permitting rotation thereof, said cushioning and cleaning elements being disposed between the eggs to cushion one from another in a direction parallel to the direction of travel of said carriage, the spaces between said tray and cover wires being open except as obstructed by said cushioning and cleaning elements, a plurality of rotary brushes arranged in opposed pairs along the path of travel of the carriage to permit the tray with the cover closed thereon to pass between them, said rotary brushes having annularly concaved portions in alinement with the rows of seats of said tray, and means for driving certain of said pairs of brushes in opposite directions.

2. In a cleaning machine, the combination with a tank, of slideways disposed therein, a carriage reciprocable on said slideways, a tray removably received by said carriage for movement through a cleaning fluid in said tank and comprising a border frame and a plurality of laterally spaced pairs of longitudinally disposed wires having spaced corrugations therein providing rows of seats adapted to receive and rotatably support eggs with their long axes disposed transversely of the path of travel of the carriage, a cover member hinged to the carriage to be closed over a tray arranged on said carriage and comprising a plurality of pairs of longitudinally disposed wires spaced to correspond to the spacing of the pairs of wires of the tray, the wires of said cover having spaced loop-like offsets therein, a plurality of combined cushioning and cleaning elements of sponge rubber engaged with said loop-like offsets whereby they are positioned between the eggs arranged in the tray when the cover is closed and yieldably engage the same while permitting rotation thereof, said cushioning and cleaning elements being disposed between the eggs to cushion one from another in a direction parallel to the direction of travel of said carriage, the spaces between said tray and cover wires being open except as obstructed by said cushioning and cleaning elements, and brushes arranged on opposite sides of the path of travel of the carriage to permit the tray with the cover closed thereon to pass between them, said brushes and carriage being relatively movable to subject the eggs carried by the tray to a rotating and brushing and cleaning action, said cushioning and cleaning elements when in cleaning position being disposed between said oppositely disposed brushes and disposed to cleaningly engage the eggs on the sides thereof between the sides cleaningly engaged by said brushes.

3. In a cleaning machine, the combination with a tank, of slideways disposed therein, a carriage reciprocable on said slideways, a tray removably received by said carriage for movement through a cleaning fluid in said tank and comprising a plurality of laterally spaced pairs of longitudinally disposed wires having spaced corrugations therein providing rows of seats adapted to receive and rotatably support eggs with their long axes disposed transversely of the path of travel of the carriage, a cover member hinged to the carriage to be closed over a tray arranged on said carriage and comprising a plurality of pairs of longitudinally disposed wires spaced to correspond to the spacing of the pairs of wires of the tray, a plurality of combined cushioning and cleaning elements carried by said cover whereby they are positioned between the eggs arranged in the tray when the cover is closed and yieldably engage the same while permitting rotation thereof, said cushioning and cleaning elements being disposed between the eggs to cushion one from another in a direction parallel to the direction of travel of said carriage, a plurality of rotary brushes arranged in opposed pairs along the path of travel of the carriage to permit the tray with the cover closed thereon to pass between them, said rotary brushes having annularly concaved portions in alinement with the rows of seats of said tray, and means for driving certain of said pairs of brushes in opposite directions.

4. In a cleaning machine, the combination with a tank, of slideways disposed therein, a carriage reciprocable on said slideways, a tray removably received by said carriage for movement through a cleaning fluid in said tank and comprising a plurality of laterally spaced pairs of longitudinally disposed wires having spaced corrugations therein providing rows of seats adapted to receive and rotatably support eggs with their long axes disposed transversely of the path of travel of the carriage, a cover member hinged to the carriage to be closed over a tray arranged on said carriage and comprising a plurality of pairs of longitudinally disposed wires spaced to correspond to the spacing of the pairs of wires of the tray, a plurality of combined cushioning and cleaning elements carried by said cover whereby they are positioned between the eggs arranged in the tray when the cover is closed and yieldably engage the same while permitting rotation thereof, said cushioning and cleaning elements being disposed between the eggs to cushion one from another in a direction parallel to the direction of travel of said carriage, and brushes arranged on opposite sides of the path of travel of the carriage to permit the tray with the cover closed thereon to pass between them, said brushes and carriage being relatively movable to subject the eggs carried by the tray to a rotating and brushing and cleaning action, said cushioning and cleaning elements when in cleaning position being disposed between said oppositely disposed brushes and disposed to cleaningly engage the eggs on the sides thereof between the sides cleaningly engaged by said brushes.

5. In a cleaning machine, a carriage mounted for traveling movement, a tray removably received by said carriage and comprising spaced pairs of longitudinally disposed wires, the wires of each pair being spaced to provide rows of seats adapted to receive and rotatably support eggs with their long axes disposed transversely of the path of travel of the carriage, a cover member adapted to be closed over a tray arranged on said carriage and comprising a plurality of pairs of longitudinally disposed wires, the wires of said cover having spaced loop-like offsets therein, a plurality of yieldable combined cushioning and cleaning elements engaged with said loop-like offsets whereby they are positioned between the eggs arranged in the tray when the cover is closed and yieldably engage the same while permitting rotation thereof, said cushioning and cleaning elements being disposed between the eggs to cushion one from another in a direction parallel to the direction of travel of said carriage, the spaces between said tray and cover wires being open except as obstructed by said cushioning and cleaning elements, brushes drivingly mounted in opposed relation along the path of travel of the carriage to permit the tray with the cover closed thereon to pass between them, and means for driving said brushes, said cushioning and cleaning elements when in cleaning position being disposed between said opposed brushes and disposed to cleaningly engage the eggs on the sides thereof between the sides cleaningly engaged by said brushes.

6. In a cleaning machine, a carriage mounted for traveling movement, a tray removably received by said carriage and comprising spaced pairs of wires, the wires of each pair being spaced to provide seats adapted to receive and rotatably support eggs, a cover member adapted to be closed over a tray arranged on said carriage and comprising a plurality of pairs of wires, yieldable combined cushioning and cleaning elements positioned between the bottom of the tray and the cover member and between the eggs arranged in the tray when the cover is closed and yieldably engaging the same while permitting rotation thereof, said cushioning and cleaning elements being disposed between the eggs to cushion one from another in a direction parallel to the direction of travel of said carriage, the spaces between said tray and cover wires being open except as obstructed by said cushioning and cleaning elements, brushes drivingly mounted in opposed relation along the path of travel of the carriage to permit the tray with the cover closed thereon to pass between them, and means for driving said brushes, said cushioning and cleaning elements when in cleaning position being disposed between said opposed brushes and disposed to cleaningly engage the eggs on the sides thereof between the sides cleaningly engaged by said brushes.

7. In a cleaning machine, a carriage mounted for traveling movement, a tray removably received by said carriage and comprising spaced pairs of wires, the wires of each pair being spaced to provide seats adapted to receive and rotatably support eggs, a cover member adapted to be closed over a tray arranged on said carriage and comprising a plurality of pairs of wires, yieldable combined cushioning and cleaning elements positioned between the bottom of the tray and the cover member and between the eggs arranged in the tray when the cover is closed and yieldably engaging the same while permitting rotation thereof, said cushioning and cleaning elements being disposed between the eggs to cushion one from another in a direction parallel to the direction of travel of said carriage, the spaces between said tray and cover wires being open except as obstructed by said cushioning and cleaning elements, brushes drivingly mounted in opposed relation along the path of travel of the carriage to permit the tray with the cover closed thereon to pass between them, said brushes having concaved portions in alinement with the rows of seats of said tray, and means for driving said brushes, said cushioning and cleaning elements when in cleaning position being disposed between said opposed brushes and disposed to cleaningly engage the eggs on the sides thereof between the sides cleaningly engaged by said brushes.

8. In a cleaning machine, a carriage mounted for traveling movement, a tray removably received by said carriage and adapted to receive and rotatably support eggs in rows with their long axes disposed transversely of the path of travel of the carriage, a tray cover member, resilient combined cushioning and cleaning elements positioned between the eggs in the rows when the cover is closed and yieldably engaging the same while permitting rotation thereof, said cushioning and cleaning elements being disposed between the eggs to cushion one from another in a direction parallel to the direction of travel of said carriage, rotary brushes arranged in opposed relation along the path of travel of the carriage to permit the tray with the cover closed to pass between them, said rotary brushes having annularly concaved portions in alinement with the rows of eggs, and means for driving said brushes.

9. In a cleaning machine, a carriage mounted for traveling movement, a tray removably received by said carriage and adapted to receive and rotatably support eggs in rows with their long axes disposed transversely of the path of travel of the carriage, a tray cover member, rotary brushes drivingly mounted in opposed relation along the path of travel of the carriage to permit the tray with the cover closed to pass between them, said brushes having concaved portions in alinement with the rows of eggs and disposed parallel to the direction of travel of said carriage, and means for driving said brushes.

10. In a cleaning machine, a carriage mounted for traveling movement, a tray removably received by said carriage and adapted to receive and rotatably support eggs in rows with their long axes disposed transversely of the path of travel of the carriage, a tray cover member, rotary brushes arranged in opposed relation along the path of travel of the carriage to permit the tray with the cover closed to pass between them, said brushes having concaved portions in alinement with the rows of eggs and disposed parallel to the direction of travel of said carriage, and means for driving said brushes with certain of them rotating in opposite directions from others.

11. In a cleaning machine, a carriage mounted for traveling movement, a tray removably received by said carriage and adapted to receive and rotatably support eggs in rows with their long axes disposed transversely of the path of travel of the carriage, a tray cover member, resilient combined cushioning and cleaning elements positioned between the bottom of the tray and the cover member and between the eggs in the rows and yieldably engaging the same while permitting rotation thereof, said cushioning and cleaning elements being disposed between the eggs to cushion one from another in a direction parallel to the direction of travel of said carriage, brushes drivingly mounted in opposed relation to permit the tray with the cover closed to pass between them, and means for driving said brushes, said cushioning and cleaning elements when in cleaning position being disposed between said opposed brushes and disposed to cleaningly engage the eggs on the sides thereof between the sides cleaningly engaged by said brushes.

12. In a cleaning machine, the combination of a carriage mounted for traveling movement, a tray mounted on said carriage and adapted to receive a plurality of eggs arranged in a row parallel to the path of travel of the carriage, a cover member hinged to said carriage to be closed over said tray, the egg retaining means for said tray and cover comprising strands arranged longitudinally relative to the path of travel of the carriage, concaved combined cushioning and cleaning elements disposed between the tray and cover member and between the eggs in the row to yieldingly engage the same while permitting rotation thereof, said cushioning and cleaning elements being disposed between the eggs to cushion one from another in a direction parallel to the direction of travel of said carriage, brushes drivingly mounted in opposed relation to permit the tray with its contents to pass between them, said brushes having concaved portions alined with the row of eggs carried by the tray, and means for driving said brushes, said cushioning and cleaning elements when in cleaning position being disposed between said opposed brushes and disposed to cleaningly engage the eggs on the sides thereof between the sides cleaningly engaged by said brushes.

13. In a cleaning machine, the combination of a carriage mounted for traveling movement, a tray mounted on said carriage and adapted to receive a plurality of eggs arranged in a row parallel to the path of travel of the carriage, the egg supporting means for said tray comprising strands arranged longitudinally relative to the path of travel of the carriage, cushioning and cleaning elements disposed above and transversely of said strands and between the eggs in the row to yieldingly and cleaningly engage the same while permitting rotation thereof, said cushioning and cleaning elements being disposed between the eggs to cushion one from another in a direction parallel to the direction of travel of the carriage, brushes drivingly mounted in opposed relation to permit the tray with its contents to pass between them, and means for driving said brushes, said cushioning and cleaning elements when in cleaning position being disposed between said opposed brushes and disposed to cleaningly engage the eggs on the sides thereof between the sides cleaningly engaged by said brushes.

14. In a cleaning machine, the combination of a carriage mounted for traveling movement, a tray mounted on said carriage and adapted to receive a plurality of eggs, a cover member hinged to said carriage to be closed over said tray, cushioning and cleaning elements disposed between the tray and cover member and between the eggs in the row to yieldingly engage the same while permitting rotation thereof, said cushioning and cleaning elements being disposed between the eggs to cushion one from another in a direction parallel to the direction of travel of said carriage, and brushes arranged in opposed relation to permit the tray with its contents to pass between them, said brushes and carriage being relatively movable to subject the eggs carried by the tray to a rotating and brushing and cleaning action, said cushioning and cleaning elements when in cleaning position being disposed between said oppositely disposed brushes and disposed to cleaningly engage the eggs on the sides thereof between the sides cleaningly engaged by said brushes.

15. In a cleaning machine, the combination of rotary brushes arranged in opposed relation, a tray adapted to be positioned between said brushes and provided with a cover, said tray being adapted to receive and rotatively support rows of eggs with their long axes disposed parallel to the axes of the brushes, the egg supporting elements of said tray comprising pairs of wires disposed transversely to the axis of the brushes, and cushioning elements arranged between the tray and its cover and connected to one of them, said cushioning elements constituting cell side members and having convexed sides, said brushes having concaved portions in alinement with the rows of eggs carried by said tray and in alinement with rows of cushioning elements.

16. In a cleaning machine, the combination of rotary brushes arranged in opposed relation, a tray adapted to be positioned between said brushes and provided with a cover, said tray being adapted to receive and rotatively support rows of eggs with their long axes disposed parallel to the axes of the brushes, the egg supporting elements of said tray comprising pairs of wires disposed transversely to the axis of the brushes, said brushes having concaved portions in alinement with the rows of eggs carried by said tray.

17. In a cleaning machine, the combination of brushes arranged in opposed relation, a tray adapted to be positioned between said brushes and provided with a cover, said tray being adapted to receive and rotatively support rows of eggs, and cleaning and cushioning elements arranged between the tray and its cover and connected to one of them, said cushioning elements constituting cell side said tray and brushes being relatively movable to rotate and brush the eggs, said cleaning and cushioning elements being positioned between the eggs to cushion one from another in a direction parallel to the direction of relative movement of said tray and brushes, said cleaning and cushioning elements when in cleaning position being disposed between said oppositely disposed brushes and disposed to cleaningly engage the eggs on the sides thereof between the sides cleaningly engaged by said brushes.

18. A tray for use in cleaning eggs adapted to receive eggs arranged in rows, a cover member, the egg retaining means for said tray and cover comprising pairs of parallel strands, each pair of strands retainingly engaging a row of eggs, and resilient combined cushioning and cleaning elements disposed between the tray and cover member and between the eggs in the rows to yieldingly engage the same while permitting rotation thereof.

19. An egg tray or holder for use in egg cleaning machines comprising a border frame and a plurality of laterally spaced pairs of longitudinally disposed wires having spaced corrugations therein providing rows of seats adapted to receive and rotatably support eggs, a cover member adapted to be closed over the tray and comprising a plurality of pairs of longitudinally disposed wires, the wires of said cover having spaced loop-like offsets therein, and a plurality of resilient elements engaged with said loop-like offsets whereby they are positioned between the eggs arranged on the tray when the cover is in closed position, said resilient elements having convexly curved sides and being adapted to yieldably support eggs arranged on the tray while permitting rotation thereof, the spaces between said tray and cover wires being open except as obstructed by said resilient elements to permit access of the bristles of brushes to the eggs.

20. An egg tray or holder for use in egg cleaning machines comprising a border frame and a plurality of laterally spaced pairs of longitudinally disposed wires having spaced corrugations therein providing rows of seats adapted to receive and rotatably support eggs, a cover member adapted to be closed over the tray and comprising a plurality of pairs of longitudinally disposed wires, and a plurality of resilient elements positioned between the edges arranged on the tray, said resilient elements having convexly curved sides and being adapted to yieldably support eggs arranged on the tray while permitting rotation thereof, the spaces between said tray and cover wires being open except as obstructed by said resilient elements to permit access of the bristles of brushes to the eggs.

21. An egg tray or holder for use in egg cleaning machines comprising a plurality of pairs of strands having spaced corrugations therein providing rows of seats adapted to receive and rotatably support eggs, and a plurality of resilient elements retainingly positioned above and between the strands of each of said pairs of strands and positioned between the eggs arranged on the strands of each of said pairs of strands to yieldably support the eggs while permitting rotation thereof.

22. An egg tray or holder for use in egg cleaning machines having seats adapted to receive and rotatably support eggs, a cover member for said tray, and resilient combined cleaning and cushioning elements retainingly disposed between the tray and cover member and disposed between adjacent eggs, said elements having curved sides and adapted to yieldably support eggs arranged on the tray while permitting rotation thereof.

23. An egg tray or holder for use in egg cleaning machines having seats adapted to receive and rotatably support eggs, a cover member for said tray, and resilient combined cleaning and cushioning elements retainingly disposed between the tray and cover member and disposed between adjacent eggs.

24. In an egg cleaning apparatus, the combination of a tank for cleaning fluid having a bottom provided with parallel raised ribs, and a tray adapted to be translated through said tank and comprising pairs of longitudinal rods spaced to receive said ribs between them, said rods being conformed to provide spaced seats adapted to receive and rotatably support eggs and permit engagement of the eggs with said ribs whereby the eggs are rotated as the trays are advanced.

25. A cleaning machine comprising a carriage mounted for traveling movement, a tray removably received by said carriage and adapted to receive and rotatably support eggs in rows with their long axes disposed transversely of the path of travel of the carriage, a tray cover member, yieldable combined cushioning and cleaning elements positioned between the bottom of the tray and the cover member and between the eggs in the rows and yieldably engaging the same while permitting rotation thereof, reciprocating brushes arranged in opposed relation to permit the closed tray to pass between them, said cushioning and cleaning elements being disposed between the eggs to cushion one from another in a direction parallel to the direction of travel of said carriage, said brushes having concaved portions in alinement with the rows of eggs, and means for reciprocating said brushes, said cushioning and cleaning elements when in cleaning position being disposed between said opposed brushes and disposed to cleaningly engage the eggs on the sides thereof between the sides cleaningly engaged by said brushes.

26. A cleaning machine comprising a carriage mounted for traveling movement, a tray removably received by said carriage and adapted to receive and rotatably support eggs in rows with their long axes disposed transversely of the path of travel of the carriage, a tray cover member, yieldable combined cushioning and cleaning elements positioned between the bottom of the tray and the cover member and between the eggs in the rows and yieldably engaging the same while permitting rotation thereof, said cushioning and cleaning elements being disposed between the eggs to cushion one from another in a direction parallel to the direction of travel of said carriage, reciprocating brushes arranged in opposed relation to permit the closed tray to pass between them, and means for reciprocating said brushes, said cushioning and cleaning elements when in cleaning position being disposed between said opposed brushes and disposed to cleaningly engage the eggs on the sides thereof between the sides cleaningly engaged by said brushes.

27. A cleaning machine comprising a tray provided with a cover and adapted to receive and rotatably support eggs in rows, yieldable cushioning elements positioned between the bottom of the tray and the cover member and between the eggs in the rows, reciprocating brushes arranged in opposed relation to permit the closed tray to pass between them, said cushioning elements being disposed between the eggs to cushion one from another in a direction parallel to the paths of reciprocation of said brushes, and means for reciprocating said brushes, said yieldable cushioning elements being disposed between said opposed brushes and disposed to yieldably engage the eggs on the sides thereof between the sides cleaningly engaged by said opposed brushes.

28. A cleaning machine comprising a tray and adapted to receive and rotatably support eggs in rows, yieldable cushioning elements positioned in the tray and between the eggs in the rows, brushes drivingly mounted in opposed relation to permit the closed tray to pass between them and to permit the brushes to brushingly engage the eggs, said cushioning elements being disposed between the eggs to cushion one from another in a direction parallel to the direction in which the brushes brushingly engage the eggs, and means for actuating said brushes to provide a combined rotating and scrubbing action on the eggs, said yieldable cushioning elements being disposed between said opposed brushes and disposed to yieldably engage the eggs on the sides thereof between the sides cleaningly engaged by said opposed brushes.

29. A cleaning machine comprising a tray and adapted to receive and rotatably support eggs in rows, yieldable cushioning elements positioned in the tray and between the eggs in the rows, brushes drivingly mounted in opposed relation to permit the closed tray to pass between them and to permit the brushes to brushingly engage the eggs, said cushioning elements being disposed between the eggs to cushion one from another in a direction parallel to the direction in which the brushes brushingly engage the eggs, said brushes having concaved portions in alinement with the rows of eggs, and means for actuating said brushes relative to the tray to provide a combined rotating and scrubbing action on the eggs, said yieldable cushioning elements being disposed between said opposed brushes and disposed to yieldably engage the eggs on the sides thereof between the sides cleaningly engaged by said opposed brushes.

ROY STANLEY DAVIS.